Feb. 25, 1958  F. W. DAVIS  2,824,314
FLUID POWER STEERING GEAR
Filed May 11, 1951  2 Sheets-Sheet 1
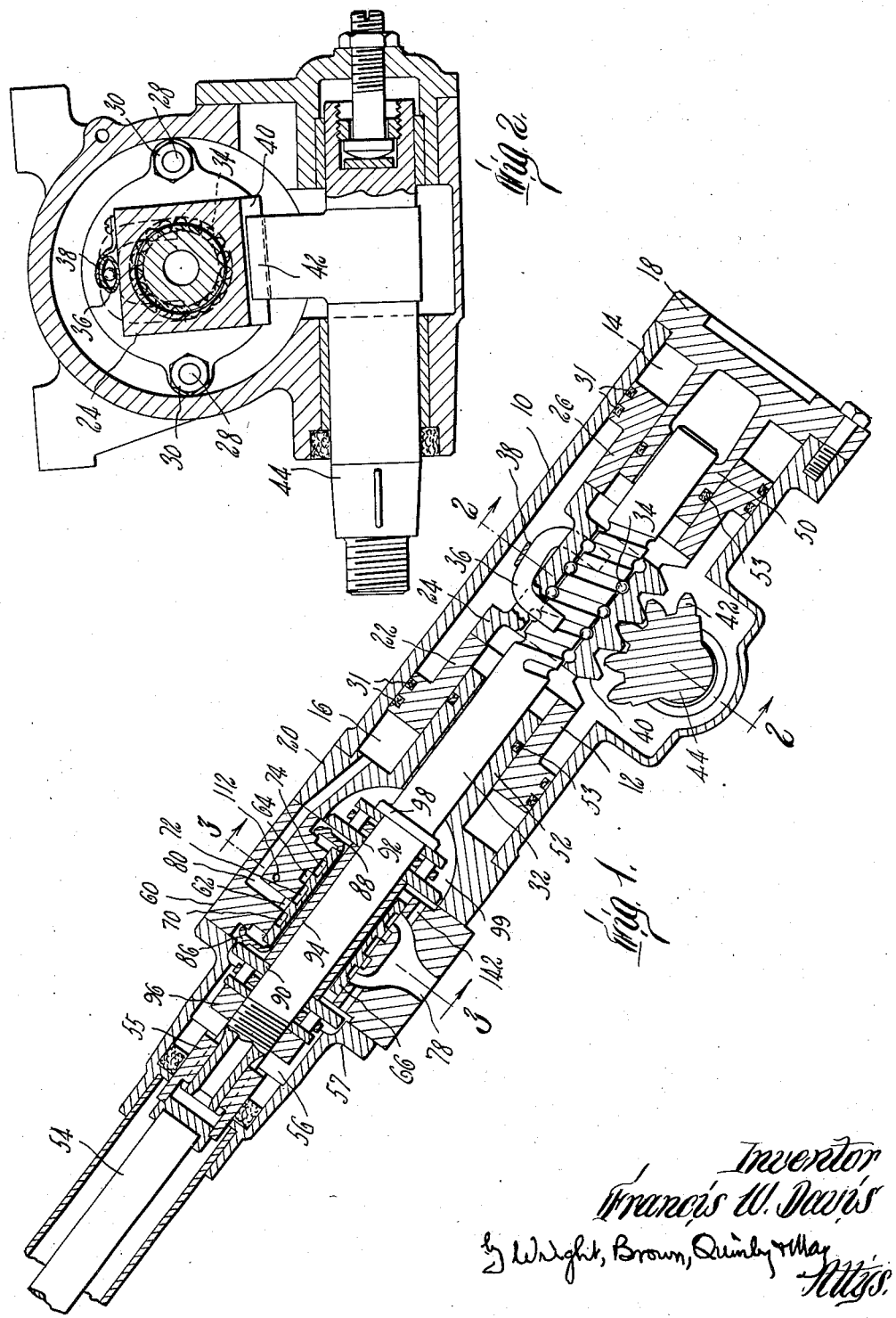
Inventor
Francis W. Davis
by Wright, Brown, Quinby & May
Attys.

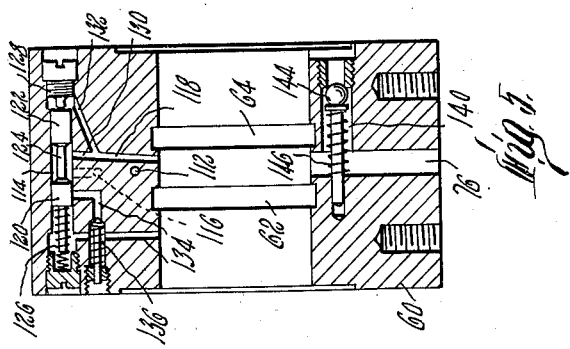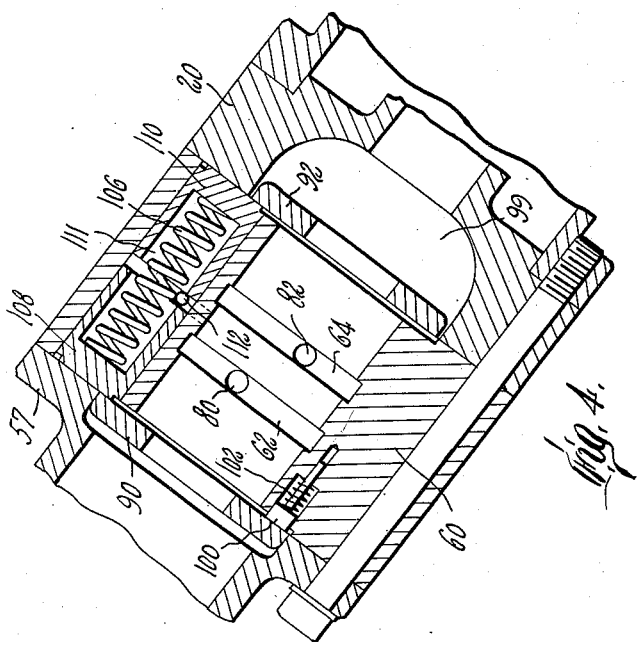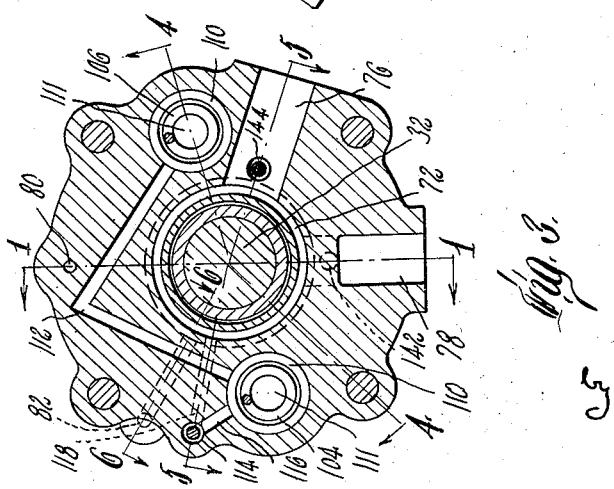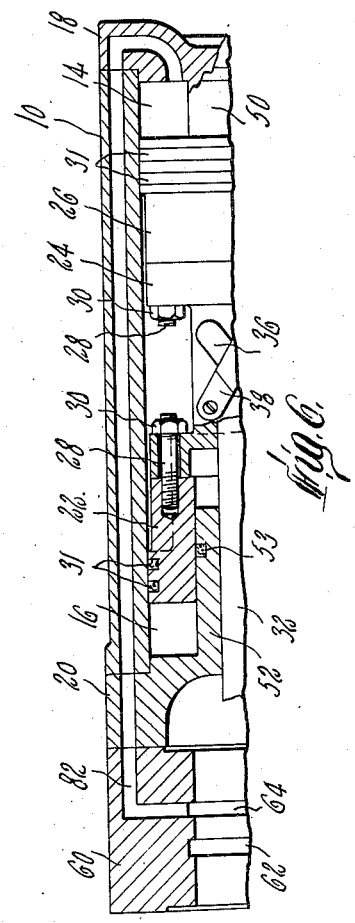

United States Patent Office 2,824,314
Patented Feb. 25, 1958

2,824,314

FLUID POWER STEERING GEAR

Francis W. Davis, Belmont, Mass.

Application May 11, 1951, Serial No. 225,849

7 Claims. (Cl. 121—46.5)

This invention relates to improvements in a fluid power steering gear including a servo-motor of the type described and illustrated in U. S. Patent No. 2,410,049 granted to me October 29, 1946. The fluid motor comprises a cylinder which is a part of the steering column and is coaxial with the steering post, and a piston slidably mounted in the cylinder, fluid under pressure being admitted into either end of the cylinder to press against the corresponding end of the piston to cause the piston to slide in the desired direction. One of the objects of the present invention is to provide a three-part piston, the mid part of which is a nut which has a rack on its outer surface to mesh with a gear sector. This mid part has a floating connection with the end parts so that no transverse force is impressed on the latter. The nut is in threaded engagement with a steering post which extends therethrough, and the gear sector with which the rack meshes is on a cross shaft which may be connected in the usual manner to the vehicle wheels to be deflected to direct the course of the vehicle. Power fluid, preferably a liquid such as oil, is supplied in the usual manner to a control valve which is in the steering column. The steering post, which is manually rotated to steer the vehicle, is at the axis of the column and extends down through the control valve as well as the piston. Rotation of the steering post thus results in axial movement of the piston which in turn results in rocking movement of the cross shaft. The reactive axial thrust on the steering post from the piston, when the steering post is rotated, tends to move the post axially. The post is capable of such movement for a small distance in either direction from a "neutral" position, such axial movement of the post being opposed by centering means hereinafter described. The control valve for the motor consists chiefly of two cooperating members one of which is stationary and may be a part of the steering column casing itself, the other or inner member being nested and axially slidable in the outer member a limited distance to vary the several valve ports formed by grooves in the two members. The inner valve member is moved by axial movement of the steering post. It is desirable that the range of axial movement of the steering post be limited to a few thousandths of an inch. For increased sensitivity of the valve it is desirable that the movable valve member have a somewhat greater range than this. Hence, according to the invention, connecting means such as levers are employed between the steering post and the movable valve member so that movements of the latter will be magnified in response to axial movements of the post.

The centering means hereinbefore referred to opposes axial movement of the steering post and of the movable valve member with respect to the stationary valve member unless and until the driven part (such as the crossshaft) offers sufficient resistance to movement in response to torque exerted on the steering post to overcome the opposition of the centering means, whereupon the steering post moves axially and the valve is thus operated to direct the power fluid into one end or the other of the cylinder so as to produce axial follow-up movement in the piston which will restore the steering post and movable valve member to their neutral positions. Thus the steering mechanism is a manually operated steering gear until resistance to the steering effort exceeds a predetermined value, whereupon power assistance is instantly and automatically called into action. When the valve-centering means is actuated by springs only, the magnitude of the resisting force which must be exceeded to bring the power actuation into play depends on the physical characteristics of the springs. The centering effect of the springs may be augmented by pressure derived from the power fluid entering the control valve. A centering means of this kind is described in my Patent No. 1,937,470, granted November 28, 1933, and works well under ordinary conditions of steering, but under certain extreme conditions of resistance, as when the vehicle wheels are to be deflected while the vehicle is standing on a dry pavement, the pressure of the liquid entering the valve may build up to a high value, resulting in a proportional centering force which must be overcome by manual effort on the steering wheel if the vehicle wheels are to be deflected. According to the present invention, the entering liquid is automatically cut off from access to the centering means when the pressure of such liquid reaches a predetermined value, thus avoiding excessive centering forces.

For a more complete understanding of the invention, reference may be had to the folowing description thereof and to the drawing, of which—

Figure 1 is a sectional view on the line 1—1 of Figure 3;
Figure 2 is a section on the line 2—2 of Figure 1;
Figure 3 is a section on the line 3—3 of Figure 1;
Figure 4 is a fragmentary section on the line 4—4 of Figure 3;
Figure 5 is a section of one of the casing members taken on the line 5—5 of Figure 3; and
Figure 6 is a fragmentary section on the line 6—6 of Figure 3.

Figure 1 shows in section the lower portion of a steering column of an automobile, embodying the invention. At the lower end of the column is a casing member 10 which serves as the cylinder of a fluid motor. A piston 12 is slidably fitted in the casing member 10, this piston forming chambers 14 and 16 within the cylinder between the ends of the piston and the respective end members 18 and 20 of the casing. The piston 12 is composed of three members 22, 24, and 26. The members 22 and 26 are end members and are secured to the central member 24 by suitable studs 28 and nuts 30 as indicated in Figures 2 and 6. The studs pass through holes in the central member 24 which are large enough to leave a little clearance, and are screw threaded into holes in the end members 22 or 26. The nuts 30 are set up tight enough to insure that the three parts reciprocate as a unitary piston but not so tight as to prevent transverse self-adjustment of the center member 24 which is thus allowed to float with respect to the end members. The end members 22 and 26 are provided with packing rings 31 to prevent leakage from the chambers 14 and 16 along the outer surface of these members.

The center member 24 is a nut having a central bore, and is operatively related to a steering post 32 which extends down through the piston coaxially with the casing 10, the connection being of the worm and nut type. In order to minimize friction, the interfaces of the nut 24 and the steering post 32 are helically grooved to accommodate a series of ball bearings 34 which run in these grooves when the steering post is rotated. A return tube 36 is secured to the mid member by a strap 38 so as to transfer the balls which approach one end of the grooved portion of the steering post to a point near the other end of the grooved portion of the steering post. In the embodiment of the invention shown in the drawings, the nut 24 is a ball nut. This nut is externally rectangular, as indicated in Figure 2, a series of gear teeth 40 being formed on one face thereof, these teeth constituting a rack which meshes with a gear sector 42. This gear sector is secured to or is integral with a cross-shaft 44, an end of which projects from the casing 10 for connection with a reach rod (not shown) or other connecting link by which the vehicle wheels may be deflected when the cross-shaft 44 is rocked in one direction or the other. In order to take up any slack which might be between the gear sector 42 and the rack 40, the teeth of the sector and rack are inclined slightly to the axis of the cross-shaft as indicated in Figure 2. Hence, by adjustably moving the cross-shaft in an axial direction toward the left as in Figure 2, slack may be eliminated between the gear sector and the ball nut. This snug fit between the gear sector and the rack, as well as the transverse component of the interfacial pressures between these parts results in a transverse thrust on the ball nut which in turn presses transversely against the steering post 32. Since there is a floating connection between the nut and the end members 22 and 26 of the piston, all of the transverse thrust is taken by the steering post 32 and none by the end members of the piston.

The portions of the steering post 32 immediately below and above the nut 24 are fitted in tubular bearing members 50 and 52 which project toward each other and are integral respectively with the cylinder ends 18 and 20. The end members of the piston are slidably fitted on the outer surfaces of the bearing members 50 and 52, and packing rings 53 are provided to prevent leakage along these surfaces from the chambers 14 and 16.

The lower portion 32 of the steering post is connected to an upper portion 54 by a splined joint 55 located in a chamber 56 within a housing member 57, a steering wheel (not shown) being mounted on the upper end of the steering post 54. The joint 55 permits limited axial movement of the lower part 32 of the post without requiring any axial movement of the upper part 54. When the steering post is turned for the purpose of deflecting the vehicle wheels, the worm connection between the post and the ball nut 24 results in a reaction force having an axial component which tends to move the lower portion 32 of the steering post up or down in the direction of its axis according to the direction of rotation of the post. As hereinafter described, suitable yielding means are provided to resist such axial movement of the post. If the resistance to steering effort overcomes the force provided for opposing axial movement of the post, then a control valve is operated in such a manner as to direct power fluid into the chamber 14 or the chamber 16 so as to move the piston axially in a direction to restore the post 32 to its normal position.

The control valve by which the power fluid is directed into one or the other of the chambers in the cylinder 10 is illustrated in Figure 1. As shown, a housing member 60, which is secured to the upper end of the end member 20 of the motor casing and to the lower end of the housing member 57, is provided with a central bore having in the wall thereof two circumferential grooves 62 and 64. Slidably fitted within this bore is a hollow cylindrical valve member 66 which is externally grooved as at 70, 72 and 74. These grooves face outward and alternate with the inwardly facing grooves 62 and 64 in the housing wall. An inlet duct 76 (Figures 3 and 5) extends through the housing member 60 at a point opposite the central groove 72. Hence this groove is constantly in communication with the source of power fluid. The grooves 70 and 74 are constantly in communication with an outlet duct 78 (Figures 1 and 3) by which power fluid discharged from the valve is directed back to the pump by a suitable conduit (not shown). The groove 62 is constantly in communication with a duct 80 which opens into the upper chamber 16. The groove 64 is in constant communication with a duct 82 (Figure 6) which leads to the lower chamber 14. There is normally a slight clearance between each two successive grooves in the series 70, 62, 72, 64, and 74 so that when the valve member 66 is in its centered or neutral position as shown in Figure 1, the power fluid in the inlet duct 76 flows into the groove 72 and divides equally, half of the fluid flowing through the groove 62 into the groove 60 and out through the discharge duct 78, the other half of the stream flowing through the groove 64 and the groove 74 into the discharge duct 78. When the valve member 66 moves axially in one direction or the other, it increases the clearance between the supply groove 72 and one or the other of the grooves adjacent thereto and at the same time decreases the clearance between the adjacent groove and the discharge groove next to it. For example, if the valve member 66 is displaced upward or to the left as in Figure 1, the clearance between the supply groove 72 and the adjacent groove 62 is increased, therefore providing a greater flow of fluid into the groove 62 and hence into the chamber 16, the clearance between the groove 62 and the discharge grove 70 being diminished by the same amount and closed when the valve member reaches its maximum displacement (usually a few thousandths of an inch). The movement of the valve member also diminishes and, in its limit position closes the clearance between the supply groove 72 and the groove 64 which is in communication with the chamber 14, and the clearance between the groove 64 and the discharge groove 74 is increased so as to facilitate discharge of fluid from the chamber 14.

Axial movements of the valve sleeve 66 result from axial movements of the steering post 32, the movements of the sleeve being magnified by levers 86 and 88 which bear at one end against the respective ends of the sleeve, and at the other end against the housing member 60 which serves as a fulcrum for each lever. Each lever is engaged at an intermediate point by a washer which is carried by the steering post. The washers 90 and 92 are clamped against a spacing sleeve 94 by a nut 96 which forces the sleeve and washer assembly against a circumferential rib 98 on the steering post, the assembly including such other spacer elements as may be required. The nut 96, the washer 90, the spacing elements between them, and the lever 86 are located in the chamber 56 within the housing member 57. The rib 98, the washer 92, the spacing elements between them, and the lever 88 are located in a chamber 99 within the housing member 20. Axial movement of the steering post causes the washer 90 or 92 to rock the lever with which it is in contact, this resulting in a greater movement of the valve sleeve 66 in the same direction.

In Figure 4 is illustrated centering means tending to maintain the steering post 32 in the neutral axial position shown in Figure 1. Since a component of gravity acts on the inclined steering post and the washer assembly, tending to move it downward or toward the right as shown in Figure 1, an opposing force is provided to balance the effect of gravity. For this purpose a plunger 100, pressed by a compressed spring 102, is set into the housing member 60 in such a manner as to press upward against the washer 90, the spring 102 being of the proper strength for the purpose. The centering means consists of two compressed springs 104 and 106 which are located in bores in the housing member 60 parallel to the main bore which contains the control valve, one of these springs being shown in Figure 4. Each of these springs is confined between a pair of hollow plungers 108 and 110 which they press away from each other against end faces of the housing members 57 and 20 which act as fixed stops for the plungers. The washers 90 and 92 bear against the ends of the plungers when the steering post and washer assembly is in the neutral position. If the assembly moves in either direction from this position, one of the washers moves away from the plungers with which it is usually in contact, and the other washer pushes its plungers from their stops against the pressure of the springs 104 and 106 which tend to restore the steering post assembly to its neutral position.

The hollows in each pair of plungers 108 and 110 form a chamber 111 in which one of the compressed springs 104 or 106 is located. These chambers communicate with each other through a duct 112, and with a bore 114 through a duct 116. From the bore 114 a duct 118 extends to the main bore of the housing member 60 at a point opposite the inlet 76 with which it is in constant communication through the groove 72 in the valve sleeve 66. Since the chambers 111 are always in communication with the inlet 76, the liquid pressure in the chambers assists the springs 104 and 106 in pressing the plungers of each pair 108, 110 apart, the force thus exerted on the plungers depending each instant on the liquid pressure conditions in the inlet 76. Thus, when the steering post assembly is axially moved so as to shift the valve sleeve 66, pressure is built up in the inlet duct as the valve acts to direct the power liquid into a cylinder chamber 14 or 16 to move the piston 12. The pressure developed in the inlet 76 is also communicated to the plungers 108 and 110, stepping up the forces which tend to move the steering post back to its neutral position. The steering resistance may at times be of considerable magnitude, as when "dry parking," that is, when attempting to deflect the vehicle wheels when the tires are at rest on a dry pavement or in ruts. A great resistance to deflection results in the building up of a proportional pressure in the power fluid in the motor and also a proportional increase in the centering forces which must be manually overcome in order to bring about a deflection of the vehicle wheels. Under such circumstances it might require exceptional muscular strength to operate the steering mechanism effectively. According to the present invention, the development of such excessive centering forces is prevented by automatically cutting off the liquid supply from the centering device when the liquid pressure reaches a predetermined magnitude. In this way the "feel" of steering resistance is effective up to a certain point, but the required steering effort does not exceed a definite maximum. To this end, a slide is fitted in the bore 114 consisting of two axially spaced sliding valve members 120 and 122 connected by an axial stem 124. A spring 126 pushes against the valve 120 so as to press the valve 122 against a fixed stop 128. The duct 118, which connects the bore 114 with the inlet 76, forks so that it enters the bore at two points 130 and 132. When the valves 120 and 122 are in their normal position as shown in Figure 5, the orifice 130 of the duct 118 and the orifice of the duct 116 open into the portion of the bore 114 between the valve members 120 and 122. The orifice 132 opens into the bore between the valve member 122 and the stop 128. A duct 134 leads from the bore 114 to a point in the main bore which is in constant communication with the discharge duct 78. The duct 134 is normally closed by the valve member 120 and has therein a spring-pressed check valve 136 which, when unseated, permits flow from the bore 114 to the discharge duct 78.

Fluid pressure in the inlet 76 is constantly communicated to the orifice 132 in the bore 114 and acts against the end of the valve member 122. When the pressure against the valve member 122 builds up to a magnitude determined by the force of the spring 126, the valves 120 and 122 are moved to the left, cutting off the duct 116 and chamber 111 from the duct 118 and connecting them with the duct 134. Excess liquid pressure in the chambers 111 is thus relieved through the duct 134, the residual pressure being determined by the strength of the spring which presses the relief valve 136.

In case of failure of the pump which supplies the pressure liquid, manual steering becomes necessary. The piston 12 then acts as a pump which, in conjunction with the resultant operation of the control valve, tends to suck liquid from the inlet 76 and to force liquid into the discharge port 78 whenever the steering wheel is turned. In order to permit local circulation under such conditions and to avoid pumping liquid into and out of the reservoir, a by-pass is provided between the inlet and outlet ports, this by-pass consisting of a duct 140 (Figure 5) leading from the inlet port 76 to the chamber 99, and a duct 142 leading from the chamber 99 to the outlet port 78. A check valve 144, lightly pressed against its seat by a weak spring 146 is placed in the duct 140 to prevent pressure fluid in the inlet 76 from flowing into the chamber 99, but to permit flow freely in the opposite direction.

I claim:

1. A fluid motor control valve comprising a housing with a bore therethrough and grooves in the wall of the bore, a hollow cylindrical valve member slidably fitted in said bore, said member having external grooves cooperating with the grooves in the bore to form valve ports which are varied by movements of the valve member relative to the housing, a lever at each end of said valve member, each said lever having one end pressing against an end of the valve member and its other end pressing in the same direction against said housing, and manually operable means bearing against an intermediate point of each lever to press said lever ends against said valve member and housing, whereby movement of said means in the direction of the axis of the valve member result in magnified movements of the valve member in the same direction.

2. A servo-motor control valve comprising an inlet and two outlets for pressure fluid, two members one of which is movable relatively to the other in opposite directions from a neutral position to direct the flow of said pressure fluid from said inlet to said outlets, means actuated by pressure fluid supplied to oppose any movement of said movable member from its neutral position, a normally open duct extending from said inlet to said means, and a stop valve in said duct responsive to the pressure of said fluid to close said duct whenever the pressure of said fluid reaches a predetermined magnitude without materially affecting the flow of pressure fluid through the valve.

3. Apparatus as in claim 2, said stop valve comprising a chamber into which said duct opens, a valve element slidably fitted in said chamber and movable therein across the duct opening to shut off the duct, spring means biasing said valve element to its open-duct position, and another duct connecting said pressure fluid inlet to said chamber at a point to direct pressure against said valve element tending to move it against the force of said spring means toward its duct-closing position.

4. A fluid motor control valve comprising two members one of which is movable relatively to the other in opposite directions from a neutral position to direct the flow of pressure fluid in diverse paths through the valve, means actuated by pressure fluid supplied to oppose any movement of said movable member from its neutral position, a normally open duct communicating with said means and conveying pressure fluid thereto, and a stop valve in said duct responsive to the pressure of said fluid to close said duct whenever the pressure of said fluid reaches a predetermined magnitude without materially affecting the flow of pressure fluid through the valve.

5. A fluid motor control valve comprising two members one of which is movable relatively to the other in opposite directions from a neutral position to direct the flow of pressure fluid in diverse paths through the valve, means reacting to pressure fluid supplied and yieldingly opposing any movement of said movable member from its neutral position, a normally open duct communicating with said means and conveying pressure fluid thereto, and a stop valve in said duct responsive to the pressure of said fluid to close said duct whenever the pressure of said fluid reaches a predetermined magnitude without materially affecting the flow of pressure fluid through the valve, said stop valve including an element contacted by said fluid slidable between normal and displaced positions at which said duct is open and closed respectively, and a spring pressing said stop valve element toward its normal position.

6. In a control valve of the open center type provided with an inlet, reservoir, and two working ports, and a valve member having a neutral position wherein flow is established between all the ports and from which position the member is shiftable for controlling flow between all of said ports, chamber means subject to a variable pressure, passage means communicating said chamber means with the inlet and reservoir ports, means in said chamber means including a reaction area associated with said member and acted upon by said variable pressure opposing movement of said member from neutral, and valve means located in said passage means and being responsive to pressure in said chamber means for controlling flow in said passage means.

7. In a power steering system including a control valve comprising a member manually movable to energize a fluid motor operably connected to a steering part, said valve having associated therewith means defining a chamber adapted to confine a body of fluid serving to resist movement of said movable member, the combination of means providing a fluid conduit to said chamber from a source of fluid pressure, valve means in said conduit adapted to block fluid flow to said chamber when the pressure therein reaches a predetermined value and means providing for the escape of fluid from said chamber on movement of said movable member following the blocking of said conduit.

References Cited in the file of this patent
UNITED STATES PATENTS

| | | |
|---|---|---|
| 1,900,218 | Aikman | Mar. 7, 1933 |
| 2,213,271 | Davis | Sept. 3, 1940 |
| 2,410,049 | Davis | Oct. 29, 1946 |
| 2,550,148 | Harding | Apr. 24, 1951 |
| 2,553,795 | Staude | May 22, 1951 |
| 2,596,242 | Hill | May 13, 1952 |